United States Patent
Balber

(10) Patent No.: US 11,943,228 B2
(45) Date of Patent: *Mar. 26, 2024

(54) DEVELOPING LEAST-PRIVILEGE PERMISSION SETS BASED ON GLOBAL OPTIMIZATION

(71) Applicant: CyberArk Software Ltd., Petach-Tikva (IL)

(72) Inventor: Michael Balber, Petach-Tikva (IL)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 388 days.

This patent is subject to a terminal disclaimer.

(21) Appl. No.: 17/511,985

(22) Filed: Oct. 27, 2021

(65) Prior Publication Data
US 2022/0201003 A1 Jun. 23, 2022

Related U.S. Application Data

(63) Continuation-in-part of application No. 17/130,428, filed on Dec. 22, 2020, now Pat. No. 11,178,154.

(51) Int. Cl.
*H04L 9/40* (2022.01)

(52) U.S. Cl.
CPC ............ *H04L 63/104* (2013.01); *H04L 63/20* (2013.01)

(58) Field of Classification Search
CPC . H04L 63/104; H04L 63/102; H04L 41/0893; H04L 63/101; H04L 63/20; G06N 3/126
See application file for complete search history.

(56) References Cited

U.S. PATENT DOCUMENTS 5,748,890 A 5/1998 Goldberg
6,466,932 B1 10/2002 Dennis
(Continued)

OTHER PUBLICATIONS

Ceesay, Ebrima N., Coimbatore Chandersekaran, and William R. Simpson. "An authentication model for delegation, attribution and least privilege." Proceedings of the 3rd International Conference on PErvasive Technologies Related to Assistive Environments. 2010. (Year: 2010).*

(Continued)

*Primary Examiner* — Jung W Kim
*Assistant Examiner* — Sameera Wickramasuriya
(74) *Attorney, Agent, or Firm* — Finnegan, Henderson, Farabow, Garrett & Dunner, LLP

(57) ABSTRACT

Disclosed embodiments relate to iteratively developing profiles for network entities. Operations may include accessing a set of permissions associated with a network entity; obtaining a set of permission vectors for the network entity based on the set of permissions; evaluating each permission vector within the set of permission vectors for iteratively developing a profile for the network entity, the evaluation being based on at least: whether each permission vector within the set of permission vectors provides sufficient privileges for the network entity to perform an action, and a predefined rule; creating a new set of permission vectors for the network entity based on at least the selected group of the set of permission vectors; iterating the evaluation for the new set of permission vectors; determining whether an iteration termination condition has been met; and terminating the iteration based on the iteration termination condition being met.

20 Claims, 3 Drawing Sheets

(56) References Cited

U.S. PATENT DOCUMENTS

| | | | |
|---|---|---|---|
| 6,978,381 B1 | 12/2005 | Te | |
| 7,219,234 B1* | 5/2007 | Ashland | G06F 21/604 726/16 |
| 7,389,430 B2 | 6/2008 | Baffes | |
| 7,555,771 B2 | 6/2009 | Bransom | |
| 8,806,569 B2 | 8/2014 | Lavi | |
| 10,749,886 B1 | 8/2020 | Kandel | |
| 10,771,337 B1 | 9/2020 | Das | |
| 10,812,482 B1* | 10/2020 | Xu | G06F 21/604 |
| 10,819,747 B1 | 10/2020 | Sedky | |
| 2013/0067546 A1 | 3/2013 | Thavasi | |
| 2014/0245394 A1 | 8/2014 | Abuelsaad | |
| 2015/0180872 A1 | 6/2015 | Christner | |
| 2016/0212169 A1 | 7/2016 | Knjazihhin | |
| 2017/0134434 A1 | 5/2017 | Allen | |
| 2017/0295183 A1* | 10/2017 | Movsisyan | H04L 63/105 |
| 2018/0246991 A1 | 8/2018 | Miya | |
| 2019/0109852 A1 | 4/2019 | Ranganathan | |
| 2019/0116189 A1 | 4/2019 | Schlegel | |

OTHER PUBLICATIONS

Wei, Xuetao, et al. "Profiledroid: Multi-layer profiling of android applications." Proceedings of the 18th annual international conference on Mobile computing and networking. 2012. (Year: 2012).

Spolaor, Riccardo, Elia Dal Santo, and Mauro Conti. "Delta: Data extraction and logging tool for android." IEEE Transactions on Mobile Computing 17.6 (2017): 1289-1302. (Year: 2017).

V. V. Sarkale, P. Rad and W. Lee, "Secure Cloud Container: Runtime Behavior Monitoring Using Most Privileged Container (MPC)," 2017 IEEE 4th International Conference on Cyber Security and Cloud Computing (CSCloud), New York, NY, USA, 2017, pp. 351-356, doi: 10.1109/CSCloud.2017.68. (Year: 2017).

* cited by examiner

DEVELOPING LEAST-PRIVILEGE PERMISSION SETS BASED ON GLOBAL OPTIMIZATION

CROSS-REFERENCE TO RELATED APPLICATIONS

This application is a continuation-in-part of U.S. application Ser. No. 17/130,428, filed on Dec. 22, 2020, currently pending, which is incorporated by reference herein in its entirety.

BACKGROUND

Privileged credentials are commonly utilized to provide users with access to resources. However, granting users access to certain resources may render the resources vulnerable. For example, when strong privileged credentials (e.g., credentials with administrative rights) fall into the hands of an attacker, these credentials may allow the attacker to take control of an organization's IT infrastructure, disable security controls, steal confidential information, commit financial fraud, or otherwise disrupt operations. Stolen, abused, or misused privileged credentials are involved in a large proportion of network security breaches.

The principle of least privilege, also known as the principle of minimal privilege or the principle of least authority, has been introduced to enhance the security of network resources. The principle of least privilege requires an entity (e.g., a process, a user, a program, etc.) to access only the information and resources that are necessary for the entity to carry out a legitimate action. However, managing the least privilege principle in modern computing platforms, including, e.g., cloud-based platforms and the like, can become very difficult due to the large amount of different permissions that need to be managed. It has become impractical for human IT managers to manage and implement the principle of least privilege in modern computing platforms.

Some solutions have been developed to help implement the principle of least privilege. These solutions may analyze the usage data of an entity and extract the least privilege permissions based on the analysis of the usage data. These solutions, however, may not be able to find the least privileged permissions when the entity usage data is missing or incomplete. There are thus needs for technological solutions for developing least-privilege profiles for such entities. Further technical improvements are described in the example embodiments below.

SUMMARY

The embodiments described below relate to iteratively developing profiles for network entities. For example, in an example embodiment there may be a non-transitory computer readable medium including instructions that, when executed by at least one processor, cause the at least one processor to perform operations for iteratively developing profiles for network entities. The operations may include accessing a set of permissions associated with a network entity; obtaining a set of permission vectors for the network entity based on the set of permissions; evaluating each permission vector within the set of permission vectors for iteratively developing a profile for the network entity, the evaluation being based on at least: whether each permission vector within the set of permission vectors provides sufficient privileges for the network entity to perform an action, and a predefined rule established based on at least one of: a number of permission entries represented by each permission vector, a number of permissions granted by each permission vector, and a similarity of each permission vector to one or more approved permission vectors; selecting a group of the set of permission vectors based on the evaluation; creating a new set of permission vectors for the network entity based on at least the selected group of the set of permission vectors; iterating the evaluation for the new set of permission vectors; determining, following at least one instance of the iteration, whether an iteration termination condition has been met; and terminating the iteration based on the iteration termination condition being met.

According to some embodiments, the evaluation is performed in terms of a fitness of each permission vector within the set of permission vectors.

According to some embodiments, the predefined rule is established based on the number of permission entries represented by each permission vector and the number of permissions granted by each permission vector, and wherein the evaluation is performed in terms of a fitness of each permission vector within the set of permission vectors to facilitate a selection of a permission vector with a smaller sum of the number of permission entries represented and the number of permissions granted.

According to some embodiments, a weight is assigned to at least one of the number of permission entries represented by each permission vector and the number of permissions granted by each permission vector.

According to some embodiments, the predefined rule is established based on the number of permission entries represented by each permission vector, and wherein the evaluation is performed in terms of a fitness of each permission vector within the set of permission vectors to facilitate a selection of a permission vector with a smaller number of permission entries represented.

According to some embodiments, the predefined rule is established based on the similarity of each permission vector to one or more approved permission vectors, and wherein the evaluation is performed to select a permission vector within the set of permission vectors that matches with the one or more approved permission vectors.

According to some embodiments, the operation further includes determining that the iteration termination condition has been met when a permission vector that matches with the one or more approved permission vectors is selected.

According to some embodiments, the operation further includes identifying a failure condition based on the iterating the evaluation for the new set of permission vectors; and reverting, based on the identified failure condition, to a previous iteration of the evaluation for the new set of permission vectors.

According to some embodiments, the operation further includes adding at least one permission attribute to the previous iteration of the evaluation for the new set of permission vectors.

According to some embodiments, the iteration termination condition is based on a number of permission vectors in the set of permission vectors stopping to decrease.

According to some embodiments, the new set of permission vectors is created by combining permission vectors from the selected group of the set of permission vectors.

According to some embodiments, the selecting the group of the set of permission vectors further includes at least one of: selecting a determined number or a determined percentage of the set of permission vectors.

According to some embodiments, the operations are performed in a sandboxed environment based on a replicated or simulated instance of the network entity.

Additional embodiments relate to a computer-implemented method for iteratively developing profiles for network entities. The method may include accessing a set of permissions associated with a network entity; obtaining a set of permission vectors for the network entity based on the set of permissions; evaluating each permission vector within the set of permission vectors for iteratively developing a profile for the network entity, the evaluation being based on at least: whether each permission vector within the set of permission vectors provides sufficient privileges for the network entity to perform an action, and a predefined rule established based on at least one of: a number of permission entries represented by each permission vector, a number of permissions granted by each permission vector, and a similarity of each permission vector to one or more approved permission vectors; selecting a group of the set of permission vectors based on the evaluation; creating a new set of permission vectors for the network entity based on at least the selected group of the set of permission vectors; iterating the evaluation for the new set of permission vectors; determining, following at least one instance of the iteration, whether an iteration termination condition has been met; and terminating the iteration based on the iteration termination condition being met.

According to some embodiments, the evaluation is performed in terms of a fitness of each permission vector within the set of permission vectors.

According to some embodiments, the predefined rule is established based on the number of permission entries represented by each permission vector and the number of permissions granted by each permission vector, and wherein the evaluation is performed in terms of a fitness of each permission vector within the set of permission vectors to facilitate a selection of a permission vector with a smaller sum of the number of permission entries represented and the number of permissions granted.

According to some embodiments, a weight is assigned to at least one of the number of permission entries represented by each permission vector and the number of permissions granted by each permission vector.

According to some embodiments, the predefined rule is established based on the number of permission entries represented by each permission vector, and wherein the evaluation is performed in terms of a fitness of each permission vector within the set of permission vectors to facilitate a selection of a permission vector with a smaller number of permission entries represented.

According to some embodiments, the predefined rule is established based on the similarity of each permission vector to one or more approved permission vectors, and wherein the evaluation is performed to select a permission vector within the set of permission vectors that matches with the one or more approved permission vectors.

According to some embodiments, the method further includes determining that the iteration termination condition has been met when a permission vector that matches with the one or more approved permission vectors is selected.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of developing least-privilege profiles for network entities addressed herein overcome several important technical problems in the fields of data security and network communications. Rather than relying on analysis of the usage data of an entity, which could be missing or incomplete, the techniques discussed below may use an iterative process to identify a minimal valid set of permissions. For example, the iterative process may start with an initial set of permissions, evaluate the permission set, and iteratively reduce the permission set until an iteration termination condition has been met. In this manner, the iterative process can identify the minimal valid set of permissions for the entity without relying on the usage data of the entity.

Reference will now be made in detail to the disclosed embodiments, examples of which are illustrated in the accompanying drawings.

Figure 1:
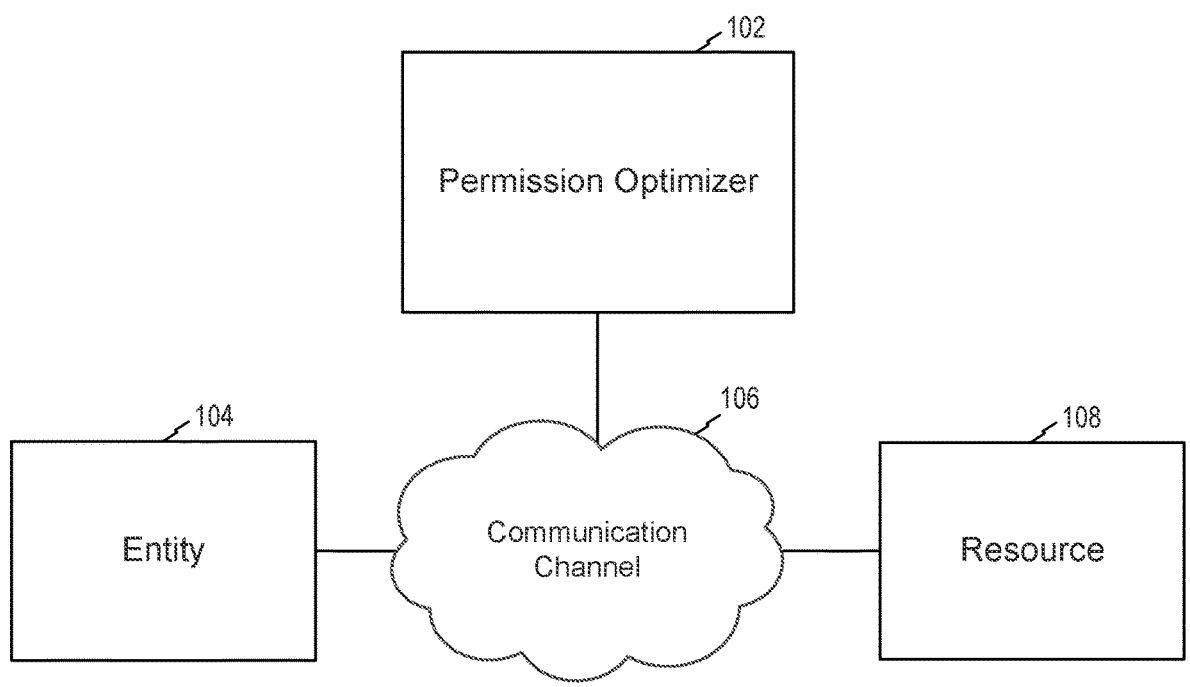
FIG. 1 is a block diagram of an exemplary system that iteratively develops least-privilege profiles for network entities in accordance with disclosed embodiments.

FIG. 1 is a block diagram of an example system 100 in accordance with disclosed embodiments. As shown, system 100 includes a permission optimizer 102, which may include one or more computing devices configured to iteratively develop a least-privilege profile for an entity 104 (e.g., a process, a program, a user, an organization, etc.) so that entity 104 can perform an action, e.g., access a resource 108 via a communication channel 106, using the least-privilege profile. In some embodiments, permission optimizer 102 may be implemented as a component of a computing device accessible to entity 104. Alternatively, in some embodiments, permission optimizer 102 may be implemented as a component of resource 108 or as a separate component. In some embodiments, permission optimizer 102 may be provided as a service, and in some embodiments, permission optimizer 102 may operate in a decentralized manner. Furthermore, in some embodiments, permission optimizer 102 may be hosted in a cloud-based network (e.g., built on virtualized infrastructure from AWS™, Azure™, IBM Cloud™, VMWare™, or others).

Entity 104 may perform the action, e.g., access resource 108, using a computing device. The computing device may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home device, industrial device, etc.), personal computer (e.g., a desktop or laptop), or various other devices capable of processing and/or receiving data. Exemplary components of the computing device are further discussed below in connection with FIG. 2.

The computing device may be in communication with resource 108 via communication channel 106. Communication channel 106 may include a bus, a cable, a wireless communication channel, a radio-based communication channel, the Internet, a local area network (LAN), a wireless local area network (WLAN), a wide area network (WAN), a cellular communication network, or any Internet Protocol (IP), Secure Shell (SSH), Hypertext Transfer Protocol (HTTP), or Representational State Transfer (REST) based communication network and the like. In some embodiments, communication channel 106 may be based on public cloud infrastructure, private cloud infrastructure, hybrid public/private cloud infrastructure, or no cloud infrastructure. In such differing embodiments, permission optimizer 102 and entity 104 may each be in the same, or in different, networks or network segments. In some embodiments, entity 104 may be equipped with one or more compatible communication interfaces configured to support communications with permission optimizer 102 via communication channel 106. In some embodiments, entity 104 may be a network entity connected to a network through the one or more compatible communication interfaces. The communication interfaces are not shown in FIG. 1 for illustrative simplicity.

Entity 104 may utilize permission optimizer 102 to iteratively develop a least-privilege profile. Entity 104 may then use the least-privilege profile to perform an action, including, e.g., accessing resource 108. In some embodiments, to enforce the principle of least privilege, entity 104 may be required to use the least-privilege profile developed by permission optimizer 102 to perform the action.

Figure 2:
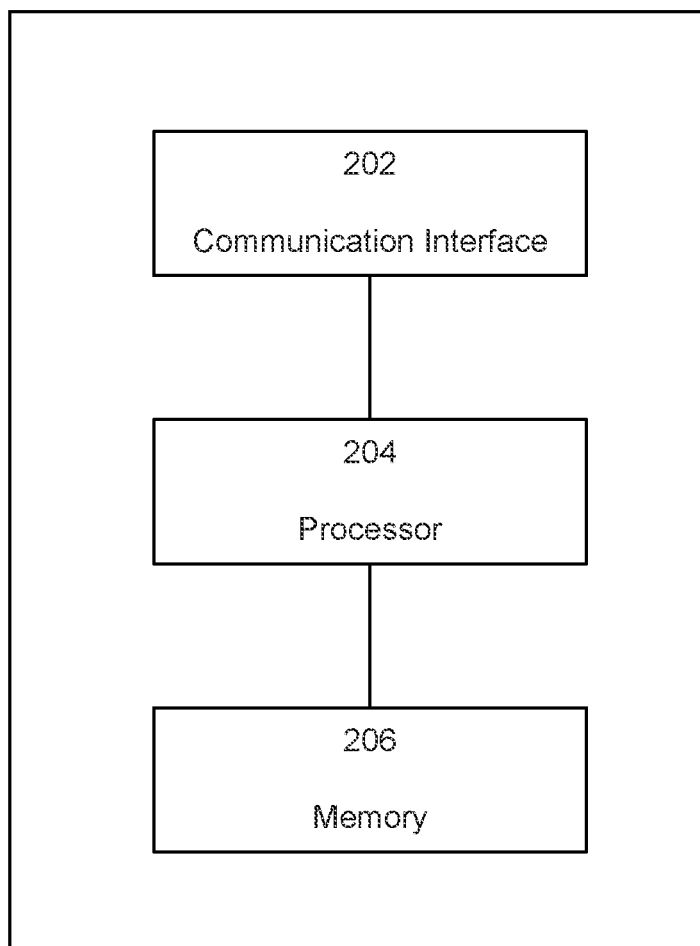
FIG. 2 is a block diagram of an example computing device in accordance with disclosed embodiments.

FIG. 2 illustrates a block diagram of an exemplary computing device 200 in accordance with disclosed embodiments. Referring to FIG. 2, computing device 200 may include a communication interface 202, a processor 204, and a memory 206, among potentially various other components.

The communication interface 202 may facilitate communications between computing device 200 and other computing devices or resources, including, e.g., computing devices utilized by permission optimizer 102, entity 104, and resource 108 (shown in FIG. 1). In some embodiments, communication interface 202 may be configured to support one or more communication standards, such as an Internet standard or protocol, an Integrated Services Digital Network (ISDN) standard, and the like. In some embodiments, communication interface 202 may include one or more of a LAN card, a cable modem, a satellite modem, a data bus, a cable, a wireless communication channel, a radio-based communication channel, a cellular communication channel, an Internet Protocol, a SSH, a HTTP, or a REST-based communication device, or other communication devices for wired and/or wireless communications. In some embodiments, communication interface 202 may be based on public cloud infrastructure, private cloud infrastructure, or hybrid public/private cloud infrastructure.

Processor 204 may include one or more dedicated processing units, application-specific integrated circuits (ASICs), field-programmable gate arrays (FPGAs), or various other types of processors or processing units. Processor 204 may be coupled with memory 206 and configured to execute instructions stored in memory 206.

Memory 206 may store processor-executable instructions and data. Memory 206 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in memory 206 are executed by processor 204, computing device 200 may perform operations for iteratively developing a least-privilege profile for entity 104, as discussed below in connection with FIG. 3.

Figure 3:
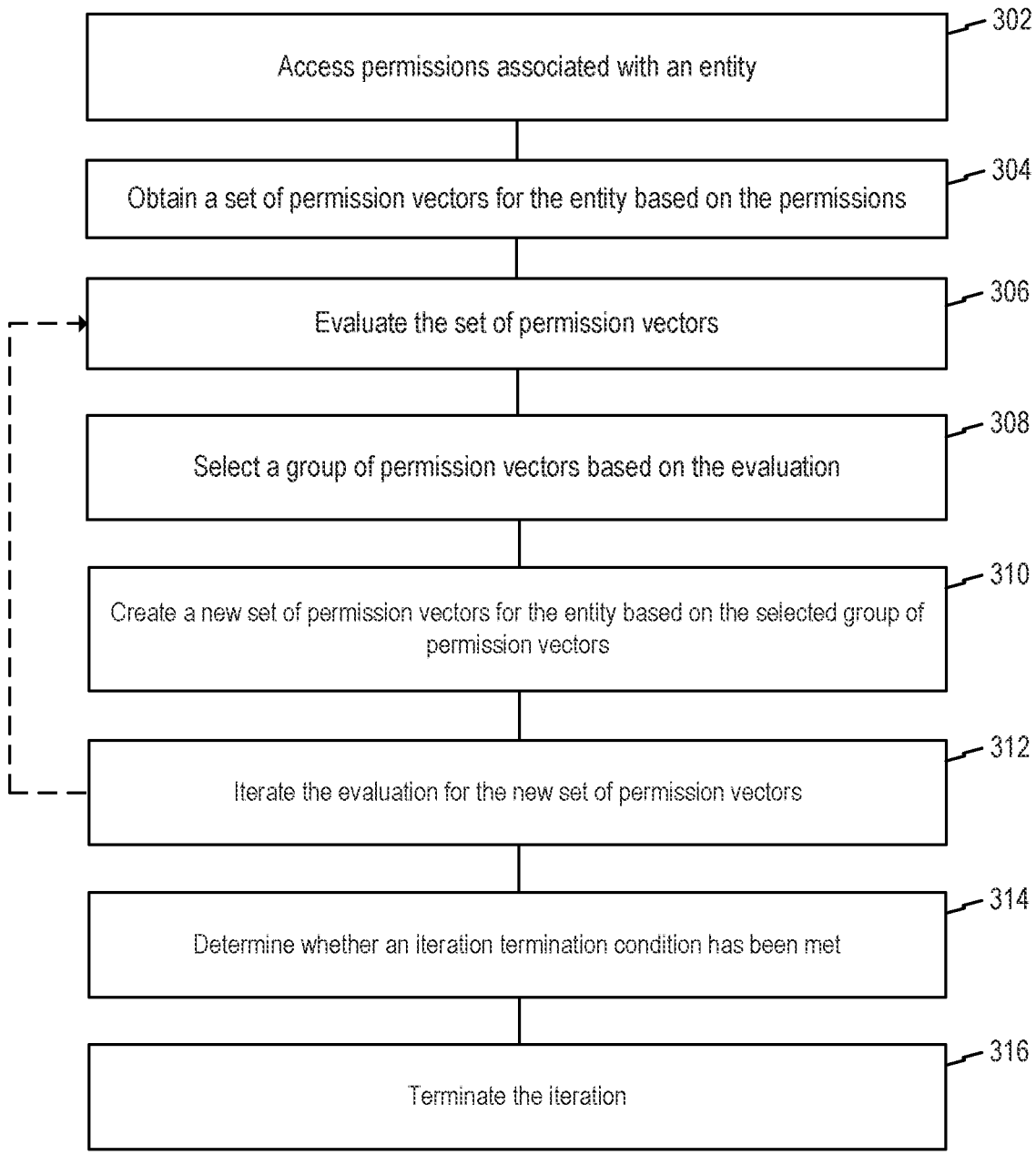
FIG. 3 is an exemplary flowchart showing a process for iteratively developing least-privilege profiles for network entities in accordance with disclosed embodiments.

Referring now to FIG. 3, an exemplary flowchart showing a process 300 for iteratively developing least-privilege profiles for network entities is shown. In accordance with above embodiments, process 300 may be implemented in system 100 as depicted in FIG. 1. For example, process 300 may be performed by one or more computing devices utilized by permission optimizer 102, entity 104, or resource 108. In some embodiments, at least some of the steps depicted in process 300 may be carried out in a sandboxed environment based on replicated or simulated instances of one or more entities and resources, including, e.g., entity 104 and resource 108. It is contemplated that carrying out process 300 in such a sandboxed environment may further improve security and may provide a more time efficient development of the least-privilege profiles for the entities, allowing process 300 to take into consideration all potential and relevant use cases for an entity in the sandboxed environment prior to deployment in production.

At step 302, process 300 may access a set of permissions associated with a network entity, e.g., entity 104. In some embodiments, the set of permissions associated with entity 104 may be represented as a N-dimensional vector, where N is the number of all possible permissions in a platform (e.g., system 100) that includes entity 104. In some embodiments, if the platform includes different categories of entities (e.g., different categories of users, accounts, machines, applications, or the like), N may be the number of all permissions associated with a particular entity category that includes entity 104. For example, if the platform includes "users" (a first entity category) and "administrators" (a second entity category), N may be the number of all permissions associated with "users" if entity 104 is one of the "users" (and not one of the "administrators").

In some embodiments, the N-dimensional vector may be implemented as a binary vector, decimal vector, hexadecimal vector, or various other types of numerical, alphabetical, or alphanumeric vectors. In the example of a binary vector, the $i^{th}$ bit in the vector may be set to 0 if permission number i is not granted to entity 104. Otherwise, if entity 104 is granted permission number i, the $i^{th}$ bit in the vector may be set to 1. For example, suppose there are seven possible permissions that can be set for entity 104, and suppose that entity 104 is granted permissions to all but the $1^{st}$ of the seven possible permissions, then the N-dimensional vector representing this set of permissions may be set as follows:

|  | Bits | | | | | | |
| --- | --- | --- | --- | --- | --- | --- | --- |
| Vector Name | 1 | 2 | 3 | 4 | 5 | 6 | 7 |
| Starting Vector | 0 | 1 | 1 | 1 | 1 | 1 | 1 |

For illustrative purposes, the vector illustrated above may be referred to as a Starting Vector, which may serve as the starting point for the iterative process that can be utilized to develop the least-privilege profile for entity 104. In some embodiments, entity 104 may be granted the permissions shown above by an administrator (e.g., a human IT manager) at the beginning of the iterative process. Alternatively, entity 104 may be granted the permissions randomly or systematically (e.g., by setting the permissions according to a default setting) at the beginning of the iterative process. It is to be understood that the permissions shown above are depicted merely for illustrative purposes and are not meant to be limiting. For example, in some embodiments, entity 104 may be granted permissions to all seven possible permissions at the beginning of the iterative process or to some of the seven possible permissions at the beginning of the iterative process.

At step 304, process 300 may obtain a set of permission vectors for the network entity based on the set of permissions represented by the Starting Vector. In some embodiments, process 300 may obtain the set of permissions by generating the set of permissions, and in some embodiments, the set of permissions may be randomly generated. For example, process 300 may obtain the set of permission vectors by randomly changing (e.g., flipping) one or more bits of the Starting Vector. Continuing with the example above, process 300 may obtain a set of four permission vectors, referred to as Candidates 1, 2, 3, and 4, as shown below:

| Vector Name | Bits | | | | | | |
| --- | --- | --- | --- | --- | --- | --- | --- |
|  | 1 | 2 | 3 | 4 | 5 | 6 | 7 |
| Candidate 1 | 0 | 1 | 0 | 1 | 1 | 0 | 1 |
| Candidate 2 | 0 | 1 | 1 | 1 | 0 | 0 | 1 |
| Candidate 3 | 0 | 1 | 0 | 1 | 1 | 1 | 1 |
| Candidate 4 | 0 | 0 | 1 | 1 | 1 | 1 | 1 |

In this example, Candidate 1 may be obtained by randomly flipping some bits, e.g., bits 3 and 6, of the Starting Vector. Similarly, Candidate 2 may be obtained by randomly flipping some bits, e.g., bits 5 and 6, of the Starting Vector. Likewise, Candidate 3 may be obtained by flipping bit 3 of the Starting Vector and Candidate 4 may be obtained by flipping bit 2 of the Starting Vector. It is contemplated that process 300 may obtain additional permission vectors in similar manners.

At step 306, process 300 may evaluate each permission within the set of permission vectors. In some embodiments, process 300 may carry out the evaluation at least partially in terms of least-privilege fitness of each permission within the set of permission vectors, based on whether each permission within the set of permission vectors provides sufficient privileges for entity 104 to perform an action, including, e.g., accessing resource 108. For example, process 300 may determine whether granting entity 104 permissions according to permission vector Candidate 1 (e.g., granting entity 104 permissions to all but the $1^{st}$ and $3^{rd}$ of the seven possible permissions) provides sufficient privileges for entity 104 to perform the action. If so, process 300 may recognize permission vector Candidate 1 as a successful candidate, which can be kept and utilized to facilitate subsequent creations of additional candidates. On the other hand, if process 300 determines that granting entity 104 permissions according to a permission vector, e.g., Candidate 4, does not provide sufficient privileges for entity 104 to perform the action, process 300 may recognize permission vector Candidate 4 as an unsuccessful candidate, which can be eliminated and not utilized to facilitate subsequent creations of candidates.

In some embodiments, process 300 may also carry out the evaluation based on the number of permissions in the set of permission vectors. Continuing with the example above, suppose Candidates 1, 2, and 3 are all recognized as successful candidates. In that situation, process 300 may still determine that Candidates 1 and 2 are better candidates than Candidate 3 because Candidates 1 and 2 each have four bits set to 1 while Candidate 3 has five bits set to 1. In other words, Candidates 1 and 2 each require less privileges compared to Candidate 3, making Candidates 1 and 2 better candidates for satisfying the least-privilege fitness.

At step 308, process 300 may select a group of the set of permission vectors based on the evaluation. In some embodiments, process 300 may select the group of the set of permission vectors by selecting a determined number or a determined percentage of the set of permission vectors. In some embodiments, process 300 may select the group of the set of permission vectors from permission vectors that have been recognized as successful. Continuing with the example above, suppose process 300 is configured to select 50% of permission vectors that have been recognized as successful, process 300 may select Candidates 1 and 2 because Candidates 1 and 2 have been recognized as successful candidates and they require less privilege compared to other successful candidates that have been recognized as successful, including, e.g., Candidate 3 and the Starting Vector.

At step 310, process 300 may create a new set of permission vectors for entity 104 based on at least the selected group of the set of permission vectors. Continuing with the example above, process 300 may use the selected group of the set of permission vectors, Candidates 1 and 2, to create a new set of three permission vectors, referred to as Candidates 5, 6, and 7, shown below:

| Vector Name | Bits | | | | | | |
| --- | --- | --- | --- | --- | --- | --- | --- |
|  | 1 | 2 | 3 | 4 | 5 | 6 | 7 |
| Candidate 5 | 0 | 1 | 0 | 1 | 1 | 0 | 0 |
| Candidate 6 | 0 | 1 | 1 | 1 | 0 | 0 | 0 |
| Candidate 7 | 0 | 1 | 1 | 0 | 0 | 0 | 1 |

In this example, Candidate 5 may be obtained by randomly flipping some bits, e.g., bit 7, of Candidate 1. Similarly, Candidate 6 may be obtained by flipping bit 7 of Candidate 2 and Candidate 6 may be obtained by flipping bit 4 of Candidate 2. It is contemplated that process 300 may obtain additional permission vectors in similar manners.

At step 312, process 300 may iterate the evaluation for the new set of permission vectors. In some embodiments, process 300 may iterate the evaluation step 306 described above. For example, process 300 may determine whether granting entity 104 permissions according to permission vector Candidate 5 provides sufficient privileges for entity 104 to perform the action. If so, process 300 may recognize permission vector Candidate 5 as a successful candidate, which can be kept and utilized to facilitate subsequent creations of additional candidates. On the other hand, if process 300 determines that granting entity 104 permissions according to a permission vector, e.g., Candidate 7, does not provide sufficient privileges for entity 104 to perform the action, process 300 may recognize permission vector Candidate 7 as an unsuccessful candidate, which can be eliminated and not utilized to facilitate subsequent creations of candidates.

Process 300 may also evaluate the new set of permission vectors at least partially based on the number of permissions in the set of permission vectors. Continuing with the example above, suppose Candidates 5 and 6 are both recognized as successful candidates. In this example, process 300 may determine that Candidates 5 and 6 are better candidates than Candidates 1 and 2 because Candidates 5 and 6 each have three bits set to 1 while Candidates 1 and 2 each have four bits set to 1. In other words, Candidates 5 and 6 each require less privilege compared to Candidates 1 and 2, making Candidates 5 and 6 better candidates for satisfying the least-privilege fitness.

Process 300 may continue through steps 308 and 310. For example, process 300 may select Candidates 5 and 6 as the group of the set of permission vectors based on the evaluation and create a new set of permission vectors for entity 104 based on Candidates 5 and 6. For illustrative purposes, suppose the new set of permission vectors includes one member, Candidate 8, obtained by flipping bit 5 of Candidate 5, as shown below:

| Vector Name | Bits | | | | | | |
|---|---|---|---|---|---|---|---|
| | 1 | 2 | 3 | 4 | 5 | 6 | 7 |
| Candidate 8 | 0 | 1 | 0 | 1 | 0 | 0 | 0 |

Process 300 may then iterate the evaluation for the new set of permission vectors and determine whether granting entity 104 permissions according to permission vector Candidate 8 provides sufficient privileges for entity 104 to perform the action. If so, process 300 may recognize permission vector Candidate 8 as a successful candidate, which can be kept and utilized to facilitate subsequent creations of additional candidates. On the other hand, if process 300 determines that granting entity 104 permissions according to Candidate 8 does not provide sufficient privileges for entity 104 to perform the action, process 300 may recognize permission vector Candidate 8 as an unsuccessful candidate, which can be eliminated and not utilized to facilitate subsequent creations of candidates.

Process 300 may also evaluate the new set of permission vectors at least partially based on the number of permissions in the set of permission vectors. Continuing with the example above, suppose Candidate 8 is recognized as a successful candidate. In that case, process 300 may determine that Candidate 8 is a better candidate than Candidates 5 and 6 because Candidate 8 only has two bits set to 1 while Candidates 5 and 6 each have three bits set to 1. In other words, Candidate 8 requires less privilege compared the Candidates 5 and 6, making Candidate 8 a better candidate for satisfying the least-privilege fitness.

Subsequently, process 300 may continue to create a new set of permission vectors based on Candidate 8 and iterate the evaluation for the new set of permission vectors as described above for one or more additional iterations. In some embodiments, following at least one instance of the iteration, process 300 may determine, at step 314, whether an iteration termination condition has been met. In some embodiments, process 300 may determine whether the iteration termination condition has been met based on the number of permissions in the set of permission vectors stopping to decrease. For example, if process 300 cannot create any new successful candidate that requires less privileges compared to Candidate 8 for a predetermined number of iterations or a predetermined period of time, process 300 may determine that an iteration termination condition has been met. And if so, at step 316, process 300 may terminate the iteration based on the iteration termination condition being met.

In some embodiments, upon termination of the iteration, process 300 may identify a successful candidate that requires the least privilege compared to all successful candidates as the least privilege candidate. And in some embodiments, process 300 may set the least-privilege profile for entity 104 according to the identified least privilege candidate. Continuing with the example above, suppose process 300 cannot create any new successful candidate that requires less privilege compared to Candidate 8 for a predetermined number of iterations. In that case, process 300 may terminate the iteration based on the iteration termination condition being met and identify Candidate 8 as the candidate that requires the least privilege. Process 300 may therefore determine that granting entity 104 permissions according to permission vector Candidate 8 (e.g., granting entity 104 permissions to only the $2^{nd}$ and 4th of the seven possible permissions) can provide sufficient privileges for entity 104 to perform the action. Process 300 may then set the least-privilege profile for entity 104 according to permission vector Candidate 8.

As described above, process 300 can use the iterative solution to identify the minimal valid set of permissions needed for entity 104. In each iteration, process 300 may evaluate a set of permission vectors, select one or more vectors that provide the best least-privilege fitness for that iteration, and continue to use the selected vectors to create additional candidate vectors that can help further minimize the permissions needed for entity 104. Process 300 may repeat this iterative solution until process 300 determines that an iteration termination condition has been met, allowing process 300 to identify a least privilege candidate that can be used to set the least-privilege profile for entity 104.

It is to be understood that process 300 may utilize various techniques to create candidate vectors at steps 304 and/or 310. For example, as described above, process 300 may take a candidate vector recognized in a previous iteration and randomly change (e.g., flip) one or more bits of the candidate vector to create one or more additional candidate vectors. Alternatively, process 300 may select two or more candidate vectors and combine permissions from the selected vectors to create additional candidate vectors. Additionally, process 300 may select two or more candidate vectors recognized in a previous iteration as parents and swap parts of selected parents to produce new candidate vectors. For example, while the illustration above described Candidate 8 as having been created by flipping bit 5 of Candidate 5, Candidate 8 may also be created by selecting Candidates 5 and 6 as parents and swapping the last three bits of Candidate 5 with the last three bits of Candidate 6. In other words, process 300 may concatenate permissions from Candidates 5 and 6 by concatenating the first four bits of Candidate 5 with the last three bits of Candidate 6. Furthermore, process 300 may utilize other techniques to create candidate vectors without departing from the spirit and scope of the present disclosure.

It is also to be understood that process 300 may utilize various techniques to evaluate the permission vectors at step 306. For example, process 300 may utilize a genetic algorithm optimization technique and evaluate each permission within the set of permission vectors in terms of least-privilege fitness. And as described above, in some embodiments, the evaluation may be based on whether each permission within the set of permission vectors provides sufficient privileges for the network entity to perform an action, and/or a number of permissions in the set of permission vectors (less being better). Alternatively, process 300 may utilize a gradient descent optimization technique, in which process 300 may start from an initial point and iteratively proceed in a direction of the lowest gradient until process 300 gets to a minimal point. For example, process 300 may take a function of N variables (N being the number of possible permissions that can be set for entity 104) and start a gradient descent from an initial point represented by the Starting Vector described above. Process 300 may then take repeated steps in the opposite direction of the gradient (or approximate gradient) of the function to iteratively minimize the value of the function. In some embodiments, process 300 may repeat the process a few times from different starting points to avoid arriving at a local minimum. In this manner, process 300 may utilize a gradient descent optimization technique or a genetic algorithm optimization technique to find a global minimum, which can be utilized to set the least-privilege profile for entity 104, as described above.

In some embodiments, process 300 may identify a failure condition based on iterating the evaluation for the new set of permission vectors. For example, as described above, process 300 may identify Candidate 4 as a failure because Candidate 4 does not provide sufficient privileges for entity 104 to perform the action. In some embodiments, if all candidates created for a particular iteration fail to provide sufficient privileges for entity 104 to perform the action, process 300 may recognize that iteration as a failure and revert, based on the identified failure condition, to a previous iteration of the evaluation for the new set of permission vectors. In this manner, process 300 can create a different set of permission vectors and evaluate the permission vectors again. Furthermore, in some embodiments, process 300 may add at least one permission attribute to the previous iteration of the evaluation for the new set of permission vectors. For instance, if a candidate vector fails to produce any successful offspring in subsequent iterations, process 300 may randomly change one or more bits of the candidate vector from 0 to 1 in an effort to facilitate subsequent creations of additional candidates.

It is to be understood that the references to the action of accessing resource 108 are presented as examples and are not meant to be limiting. It is contemplated that process 300 may be utilized to iteratively develop least-privilege profiles for entities configured to perform various types of actions, including actions to be performed locally at the entities or remotely on other resources. It is also to be understood that the references to entity 104 and resource 108 described in the examples above are not meant to be limiting. It is contemplated that system 100 may be configured to support multiple entities and multiple resources without departing from the spirit and scope of the present disclosure.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

For instance, in some embodiments, process 300 may be utilized to iteratively develop profiles that may not necessarily be the least-privilege, but may satisfy certain considerations or predefined rules that make these profiles useful. For example, as will be described further below, in some embodiments, predefined rules may be established to facilitate finding of an optimal profile that is simple and efficient to set up, even if the profile may grant more permissions compared to a true least-privilege profile. In another example, the predefined rules may be established based on similarities between a candidate profile being evaluated and one or more existing profiles that have already been approved. In this manner, the process may facilitate finding of a profile similar or identical to an approved profile, which can further improve efficiencies.

In some embodiments, to facilitate finding of an optimal profile, the predefined rules may be established based on the number of permission entries specified in a candidate profile and the number of permissions granted by the candidate profile. Furthermore, in some embodiments, the predefined rules may be established to work in conjunction with a fitness function to find an optimal profile that has the lowest combined sum of the number of permission entries and permissions granted.

For example, to facilitate finding of an optimal profile in a cloud-based network such as AWS™, Azure™ and the like, various candidate profiles may be created to express permissions in terms of services and actions. Suppose that one of the candidate profiles grants an entity (e.g., a user) permissions to perform actions "a" and "b" for service "S3" and action "a" for service "EC2," that profile may express these permissions as {Service:Action} key-value pairs: {S3: a}, {S3:b}, and {EC2:a}. In this example, the number of permission entries (i.e., the number of key-value pairs) is 3, and the number of permissions granted is 3, resulting in a sum of 6, which may be utilized as the fitness score of this particular candidate profile.

Continuing with the example above, suppose that another candidate profile grants the entity permissions to perform all actions with respect to service "S3" but no actions with respect to service "EC2," that candidate profile may express these permissions as: {S3:*}. In this example, the number of permission entries is 1, and the number of permissions granted equals to the total number of all possible actions users can perform with respect to service "S3." Suppose that the total number of all possible actions users can perform with respect to service "S3" is 20 (actions "a" and "b" being 2 out of the 20 possible actions that can be performed with respect to service "S3"), then the fitness score of this candidate profile is 1+20=21.

Continuing with the example above, suppose that still another candidate profile grants the entity permissions to perform 18 specific actions with respect to service "S3" and no actions with respect to service "EC2," that candidate profile may express these permissions as 18 key-value pairs: {S3:a}, {S3:b}, . . . , {S3:r}. In this example, the number of permission entries is 18, and the number of permissions granted is also 18, resulting in a sum of 36, representing the fitness score of this particular candidate profile.

For illustrative purposes, suppose that each of these three candidate profiles described above may provide sufficient privileges for the entity to perform its intended operations, then process 300 may consider the first candidate profile, expressed as {S3:a}, {S3:b}, and {EC2:a}, to be a better fit than the other two because it has the lowest fitness score amongst the three candidate profiles.

It is to be understood that defining the fitness function as the sum of the number of permission entries specified in a candidate profile and the number of permissions granted by the candidate profile is merely provided as one example and is not meant to be limiting. It is contemplated that the fitness function, denoted as F( ), may be generally defined as $F(X_i^n)=\Sigma a_i x_i$, where $a_i$ represents a weight and $x_i$ represents a factor to be considered in calculating the fitness score of the profile. In the above example, the weight $a_i$ was set to 1 and $x_i$ was used to represent the number of key-value pairs expressed in the candidate profiles and the number of permissions granted in these candidate profiles. It is to be understood that the weight $a_i$ may vary based on the action types or other considerations. For example, in some embodiments, a weight is assigned to at least one of the number of permission entries represented by each permission vector and the number of permissions granted by each permission vector, and in some embodiments, a read action may carry a small (or zero) weight, a write action may carry a greater weight compared to a read action, a delete action may carry a greater weight compared to a write action, and a grant of all actions ("*") may carry an even greater weight compared to a delete action, and so on.

Likewise, it is to be understood that the factors $x_i$ may also vary. Such factors may include, e.g., the number of resources the entity is granted access to and the sensitivity of each resource. Other factors may also include, e.g., certain qualitative measurements. For example, in some embodiments, the fitness function F( ) may be defined to favor profiles that use smaller number of permission entries (e.g., key-value pairs) to express. In this manner, a profile that grants all read access to service "S3," expressed as {S3:get*}, may receive a lower (i.e., better) fitness score compared to a profile that lists the read access permissions more granularly as {S3:getA}, {S3:getB}, {S3:getC}, {S3:getD}. And in some embodiments, process 300 may divide the permissions into a few categories, including, e.g., read, write, execute, delete, etc. In this manner, for each given candidate profile, process 300 may determine how many permissions are granted within each category and score the candidate profiles accordingly.

In some embodiments, candidate profiles may be expressed using permission vectors, which may be iteratively created and evaluated as described above. For example, in some embodiments, a permission vector may include a bit for each action that can be granted for each service. For illustrative purposes, suppose there are two services, "S3" and "EC2," and each service allows actions "a" and "b" as the only possible actions that can be granted, then a corresponding candidate permission vector may include 4 bits representing permissions granted to the 4 actions:

| Bits | 1 | 2 | 3 | 4 |
|---|---|---|---|---|
| Service:Action Vector | S3:a 0/1 | S3:b 0/1 | EC2:a 0/1 | EC2:b 0/1 |

In some embodiments, the permission vector may also be defined to include permissions granted more broadly, e.g., using all actions ("*") or all read actions ("get*") and the like. Continuing with the example above, suppose both services "S3" and "EC2" support grant of all actions ("*"), then a corresponding candidate permission vector may include 6 bits representing permissions granted to the 4 specific actions plus the 2 all actions:

| Bits | 1 | 2 | 3 | 4 | 5 | 6 |
|---|---|---|---|---|---|---|
| Service:Action Vector | S3:a 0/1 | S3:b 0/1 | EC2:a 0/1 | EC2:b 0/1 | S3:* 0/1 | EC2:* 0/1 |

In this manner, a profile that grants {S3:*} may be expressed as Vector A below:

| Bits | 1 | 2 | 3 | 4 | 5 | 6 |
|---|---|---|---|---|---|---|
| Service:Action Vector A | S3:a 0 | S3:b 0 | EC2:a 0 | EC2:b 0 | S3:* 1 | EC2:* 0 | which would provide the same amount of access compared to a profile that grants {S3:a} and {S3:b}, expressed as Vector B below:

| Bits | 1 | 2 | 3 | 4 | 5 | 6 |
|---|---|---|---|---|---|---|
| Service:Action Vector B | S3:a 1 | S3:b 1 | EC2:a 0 | EC2:b 0 | S3:* 0 | EC2:* 0 |

However, the profile that grants {S3:*} only has one permission entry specified therein, whereas the profile that grants {S3:a} and {S3:b} has two permission entries. Therefore, the two profiles may score differently, depending on how the fitness function is defined. If the fitness function favors profiles that use smaller number of key-value pairs, the profile that grants {S3:*} (expressed as Vector A) may score lower (i.e., better) compared to the profile that grants {S3:a} and {S3:b} individually (expressed a Vector B). On the other hand, if the fitness function assigns a significant weight to a grant of all actions ("*"), i.e., the fitness function favors a more granular definition of permissions, then the profile that grants {S3:a} and {S3:b} individually may score lower (i.e., better) compared to the profile that grants {S3:*}.

In some embodiments, process 300 may also create a translated vector if a permission is granted using all actions ("*"). In some embodiments, the translated vector may expand the permissions granted using all actions ("*"), allowing process 300 to determine the specific number of permissions granted by the original vector. Continuing with the example above, process 300 may create a translated vector corresponding to Vector A as follows, allowing process 300 to determine that the specific number of permissions granted by Vector A is 2:

| Bits | 1 | 2 | 3 | 4 | 5 | 6 |
|---|---|---|---|---|---|---|
| Service:Action Translated Vector A | S3:a 1 | S3:b 1 | EC2:a 0 | EC2:b 0 | S3:* N/A | EC2:* N/A |

It is to be understood that because Vector B does not grant any permissions using all actions ("*"), process 300 does not need to create a translated vector for Vector B.

In some embodiments, process 300 may determine the number of permission entries specified in a candidate profile based on the number of bits set to "1" in the corresponding permission vector that represents the candidate profile. Process 300 may also determine the number of permissions granted by the permission vector representing the candidate profile based on the number of bits set to "1" in the translated vector. In this manner, process 300 may utilize the predefined rules in conjunction with the fitness function to find an optimal profile. For example, in some embodiments, process 300 may perform an evaluation in terms of a fitness of each permission vector within a set of candidate permission vectors to facilitate a selection of a permission vector with a smaller sum of the number of permission entries represented and the number of permissions granted, as described above.

Additionally and/or alternatively, in some embodiments, the predefined rules may be established based on similarities between each candidate profile being evaluated and one or more approved profiles. For example, in some embodiments, process 300 may keep creating new permission vectors during the iterative process, which may determine a similarity of each new permission vector to one or more approved permission vectors. If one of the new vectors matches a vector that has already been used to create a user profile, that match may trigger a termination condition for process 300. In this manner, process 300 may be able to replicate or create a similar profile based on the matching vector, further improving the efficiency of process 300.

It is to be understood that the match referenced above does not need to be exact. For example, in some embodiments, a threshold (e.g., the number of bits that are allowed to be different) may be defined such that if the difference between a new permission vector and one that has already been used to create a user profile is under the threshold, the match may be considered close (or close enough) to trigger the termination condition.

In some embodiments, the match may be performed against one or more existing groups of approved vectors, and in some embodiments, depending on whether the new vector matches with any of the groups (and if so, which group the new vectors matches with), process 300 may determine whether the termination condition is triggered. For example, in some embodiments, if a new vector does not match with any of the groups of approved vectors, the new vector may be eliminated immediately. On the other hand, if the new vector matches with a group of approved vectors, process 300 may determine whether there exists another group that grants even fewer permissions. If so, process 300 may continue its iterative process because a potentially better permission vector (in terms of fitness scores) may exist. Otherwise (i.e., the new vector matches with a group that already grants fewer permissions compared to other groups), process 300 may determine that the termination condition has been triggered, and create a profile based on the new vector accordingly.

It is to be understood that the disclosed embodiments may be implemented in a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for iteratively developing least-privilege profiles for network entities, the operations comprising:
   accessing a set of permissions associated with a network entity;
   obtaining a set of permission vectors for the network entity based on the set of permissions;
   evaluating each permission vector within the set of permission vectors for iteratively developing a least-privilege profile for the network entity, based on at least:
      whether each permission vector within the set of permission vectors provides sufficient privileges for the network entity to perform an action, and
      a predefined rule established based on at least one of: a number of permission entries represented by each permission vector, a number of permissions granted by each permission vector, and a similarity of each permission vector to one or more approved permission vectors;
   selecting a group of the set of permission vectors based on the evaluation;
   creating a new set of permission vectors for the network entity based on at least the selected group of the set of permission vectors;
   iterating the evaluation for the new set of permission vectors;
   determining, following at least one instance of the iteration, whether an iteration termination condition has been met; and
   terminating the iteration based on the iteration termination condition being met.

2. The non-transitory computer readable medium of claim 1, wherein the evaluation is performed in terms of a fitness of each permission vector within the set of permission vectors.

3. The non-transitory computer readable medium of claim 1, wherein the predefined rule is established based on the number of permission entries represented by each permission vector and the number of permissions granted by each permission vector, and wherein the evaluation is performed in terms of a fitness of each permission vector within the set of permission vectors to facilitate a selection of a permission vector with a smaller sum of the number of permission entries represented and the number of permissions granted.

4. The non-transitory computer readable medium of claim 3, wherein a weight is assigned to at least one of the number of permission entries represented by each permission vector and the number of permissions granted by each permission vector.

5. The non-transitory computer readable medium of claim 1, wherein the predefined rule is established based on the number of permission entries represented by each permission vector, and wherein the evaluation is performed in terms of a fitness of each permission vector within the set of permission vectors to facilitate a selection of a permission vector with a smaller number of permission entries represented.

6. The non-transitory computer readable medium of claim 1, wherein the predefined rule is established based on the similarity of each permission vector to one or more approved permission vectors, and wherein the evaluation is performed to select a permission vector within the set of permission vectors that matches with the one or more approved permission vectors.

7. The non-transitory computer readable medium of claim 6, further comprising:
determining that the iteration termination condition has been met when a permission vector that matches with the one or more approved permission vectors is selected.

8. The non-transitory computer readable medium of claim 1, wherein the operations further comprise:
identifying a failure condition based on the iterating the evaluation for the new set of permission vectors; and
reverting, based on the identified failure condition, to a previous iteration of the evaluation for the new set of permission vectors.

9. The non-transitory computer readable medium of claim 8, wherein the operations further comprise adding at least one permission attribute to the previous iteration of the evaluation for the new set of permission vectors.

10. The non-transitory computer readable medium of claim 1, wherein the iteration termination condition is based on a number of permission vectors in the set of permission vectors stopping to decrease.

11. The non-transitory computer readable medium of claim 1, wherein the new set of permission vectors is created by combining permission vectors from the selected group of the set of permission vectors.

12. The non-transitory computer readable medium of claim 1, wherein selecting the group of the set of permission vectors includes at least one of: selecting a determined number or a determined percentage of the set of permission vectors.

13. The non-transitory computer readable medium of claim 1, wherein the operations are performed in a sandboxed environment based on a replicated or simulated instance of the network entity.

14. A computer-implemented method for iteratively developing least-privilege profiles for network entities, the method comprising:
accessing a set of permissions associated with a network entity;
obtaining a set of permission vectors for the network entity based on the set of permissions;
evaluating each permission vector within the set of permission vectors for iteratively developing a least-privilege profile for the network entity, based on at least:
whether each permission vector within the set of permission vectors provides sufficient privileges for the network entity to perform an action, and
a predefined rule established based on at least one of:
a number of permission entries represented by each permission vector, a number of permissions granted by each permission vector, and a similarity of each permission vector to one or more approved permission vectors;
selecting a group of the set of permission vectors based on the evaluation;
creating a new set of permission vectors for the network entity based on at least the selected group of the set of permission vectors;
iterating the evaluation for the new set of permission vectors;
determining, following at least one instance of the iteration, whether an iteration termination condition has been met; and
terminating the iteration based on the iteration termination condition being met.

15. The computer-implemented method of claim 14, wherein the evaluation is performed in terms of a fitness of each permission vector within the set of permission vectors.

16. The computer-implemented method of claim 14, wherein the predefined rule is established based on the number of permission entries represented by each permission vector and the number of permissions granted by each permission vector, and wherein the evaluation is performed in terms of a fitness of each permission vector within the set of permission vectors to facilitate a selection of a permission vector with a smaller sum of the number of permission entries represented and the number of permissions granted.

17. The computer-implemented method of claim 16, wherein a weight is assigned to at least one of the number of permission entries represented by each permission vector and the number of permissions granted by each permission vector.

18. The computer-implemented method of claim 14, wherein the predefined rule is established based on the number of permission entries represented by each permission vector, and wherein the evaluation is performed in terms of a fitness of each permission vector within the set of permission vectors to facilitate a selection of a permission vector with a smaller number of permission entries represented.

19. The computer-implemented method of claim 14, wherein the predefined rule is established based on the similarity of each permission vector to one or more approved permission vectors, and wherein the evaluation is performed to select a permission vector within the set of permission vectors that matches with the one or more approved permission vectors.

20. The computer-implemented method of claim 19, further comprising:
determining that the iteration termination condition has been met when a permission vector that matches with the one or more approved permission vectors is selected.

* * * * *